US011692631B2

(12) United States Patent
George

(10) Patent No.: US 11,692,631 B2
(45) Date of Patent: Jul. 4, 2023

(54) AUTOMATIC WIPER FOR SEAL STACK ASSEMBLY

(71) Applicant: SAINT-GOBAIN PERFORMANCE PLASTICS CORPORATION, Solon, OH (US)

(72) Inventor: Douglas George, Trumbull, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 23 days.

(21) Appl. No.: 17/445,341

(22) Filed: Aug. 18, 2021

(65) Prior Publication Data

US 2022/0056998 A1    Feb. 24, 2022

Related U.S. Application Data

(60) Provisional application No. 63/068,510, filed on Aug. 21, 2020.

(51) Int. Cl.
*F16J 15/3284*    (2016.01)
(52) U.S. Cl.
CPC .................. *F16J 15/3284* (2013.01)
(58) Field of Classification Search
CPC ... F16J 15/3236; F16J 15/3228; F16J 15/3284
See application file for complete search history.

(56) References Cited

U.S. PATENT DOCUMENTS

| 236,116 | A | * | 12/1880 | Tripp | ............... F16J 15/3212 |
| | | | | | 277/508 |
| 424,978 | A | * | 4/1890 | Harris | .................. F16J 15/182 |
| | | | | | 277/545 |
| 862,946 | A | * | 8/1907 | Tucker | ................... F16J 15/28 |
| | | | | | 277/548 |

(Continued)

FOREIGN PATENT DOCUMENTS

| DE | 285159 A5 | 12/1990 |
| EP | 2570705 B1 | 4/2016 |

(Continued)

OTHER PUBLICATIONS

International Search Report for PCT/US2021/071219, dated Nov. 29, 2021, 12 pages.

(Continued)

*Primary Examiner* — Gilbert Y Lee
(74) *Attorney, Agent, or Firm* — Abel Schillinger, LLP; Robert N Young

(57) ABSTRACT

Systems and methods include providing an annular seal stack for an assembly. The seal stack assembly is disposed between a probe and a housing of the assembly and configured to provide a radial seal between the probe and the housing. The seal stack assembly includes a first metallic seal, a second metallic seal, and a wiper assembly disposed between the first metallic seal and the second metallic seal. The wiper assembly includes a first wiper housing component having a tapered inner surface, a second wiper housing component having a tapered inner surface opposite the (Continued)

tapered inner surface of the first wiper housing component, and a wiper disposed between the first wiper housing component and the second wiper housing component.

18 Claims, 5 Drawing Sheets

(56) References Cited

U.S. PATENT DOCUMENTS

| | | | |
|---|---|---|---|
| 1,180,211 A * | 4/1916 | Throp et al. | F16J 15/28 |
| | | | 277/548 |
| 1,591,876 A * | 7/1926 | Clarence | F16J 15/28 |
| | | | 277/533 |
| 5,131,666 A | 7/1992 | Hutchens | |
| 5,297,805 A | 3/1994 | Merkin et al. | |
| 6,705,615 B2 | 3/2004 | Milberger et al. | |
| 7,445,047 B2 | 11/2008 | Gomez | |
| 7,828,297 B2 | 11/2010 | Hoebel et al. | |
| 8,474,827 B2 | 7/2013 | Grondahl et al. | |
| 9,458,691 B2 | 10/2016 | Rowe et al. | |
| 9,506,588 B2 | 11/2016 | Cronin et al. | |
| 10,053,946 B2 | 8/2018 | Nguyen et al. | |
| 10,274,117 B2 | 4/2019 | Cronin et al. | |
| 2007/0089887 A1 | 4/2007 | Gomez | |
| 2011/0197757 A1 | 8/2011 | Hold et al. | |
| 2013/0087977 A1 | 4/2013 | Galle et al. | |
| 2014/0048461 A1 | 2/2014 | Wrage et al. | |
| 2014/0224496 A1 | 8/2014 | Nguyen et al. | |
| 2018/0372223 A1 | 12/2018 | Yoshitsune et al. | |
| 2019/0032442 A1 | 1/2019 | Kohn et al. | |
| 2020/0386218 A1 | 12/2020 | Feistel | |
| 2022/0056997 A1 | 2/2022 | Armitage et al. | |

FOREIGN PATENT DOCUMENTS

| | | |
|---|---|---|
| EP | 3504437 B1 | 8/2020 |
| JP | 2008121846 A | 5/2008 |
| JP | 2020520435 A | 7/2020 |
| WO | 2014038956 A1 | 3/2014 |
| WO | 2016126242 A1 | 8/2016 |
| WO | 2022040684 A1 | 2/2022 |
| WO | 2022040686 A1 | 2/2022 |

OTHER PUBLICATIONS

International Search Report for PCT/US2021/071223, dated Nov. 29, 2021, 12 pages.

* cited by examiner

AUTOMATIC WIPER FOR SEAL STACK ASSEMBLY

CROSS-REFERENCE TO RELATED APPLICATION(S)

This application claims priority under 35 U.S.C. § 119(e) to U.S. Provisional Application No. 63/068,510, entitled "AUTOMATIC WIPER FOR SEAL STACK ASSEMBLY," by Douglas GEORGE, filed Aug. 21, 2020, which is assigned to the current assignee hereof and incorporated herein by reference in its entirety for all purposes.

BACKGROUND OF THE INVENTION

Seals are used in many industrial applications to prevent leakage between components of an assembly. In some applications, seals may be subjected to extreme operating conditions, such as extreme pressures or temperatures. These extreme operating conditions often necessitate the use of a seal stack assembly that uses a wiping function to remove debris, such as sea floor sediment, well fluids, fracking sand, and/or other contaminants, from the probe or shaft of the assembly to prevent damage to the seal stack assembly, which can result in significant leakage. At extreme pressures exceeding a certain threshold, traditional seal stack assemblies may not effectively remove the debris. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
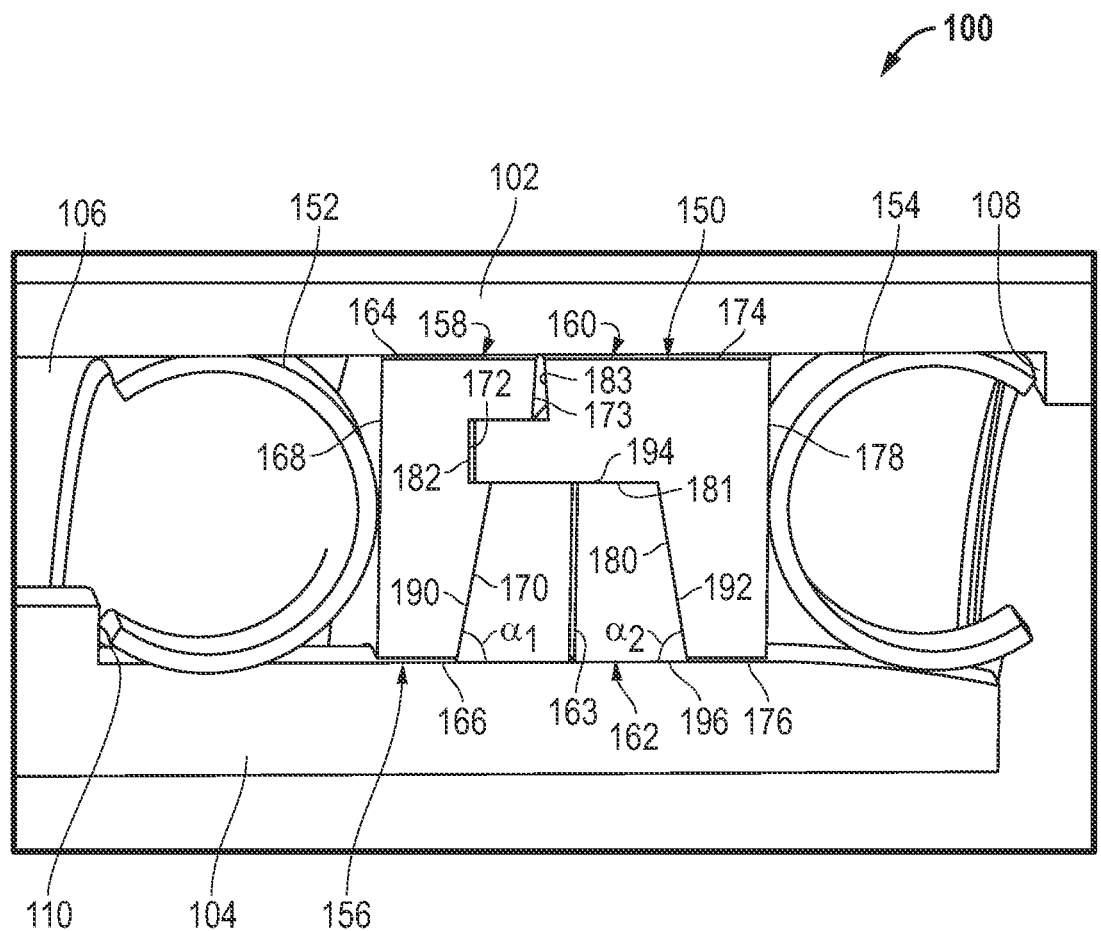
FIG. 1 is a partial cross-sectional view of an assembly having an annular seal stack assembly according to an embodiment of the disclosure.

FIG. 1 shows a partial cross-sectional view of an assembly 100 having a seal stack assembly 150 according to an embodiment of the disclosure. In some embodiments, the assembly 100 may be a coupling assembly, a solenoid assembly, or a valve assembly. In more specific embodiments, the assembly 100 may be a subsea coupling assembly, a subsea solenoid assembly, or a subsea valve assembly. The assembly 100 may generally comprise a housing 102 and a probe 104 that oscillates, reciprocates, rotates, vibrates, or combinations thereof with respect to the housing 102. The assembly 100 may further comprise a cavity 106 formed between the housing 102 and the probe 104. In some embodiments, the housing 102 may comprise a shoulder 108, and the probe 104 may comprise a shoulder 110 that further define the cavity 106.

An annular seal stack assembly 150 may generally be disposed within the cavity 106 of the assembly 100 and annularly about the probe 104. The seal stack assembly 150 may generally comprise a first resilient metal seal 152, a second resilient metal seal 154, and a wiper assembly 156 disposed between the seals 152, 154. The seal stack assembly 150 may be disposed radially between the housing 102 and the probe 104. The seal stack assembly 150 may be disposed axially between the shoulders 108, 110 of the housing 102 and the probe 104. The seal stack assembly 150 may generally be configured to contact and provide a radial seal between the housing 102 and the probe 104 of the assembly 100. The seal stack assembly 150 may also be configured to center the probe 104 within the housing 102 and dynamically wipe the probe 104 during operation of the assembly 100 to keep the probe 104 free of contaminants and/or other debris that may affect the integrity of the radial seal formed between the housing 102 and the probe 104.

The first seal 152 may generally be disposed between and in contact with the housing 102 and the probe 104. In some embodiments, the first seal 152 may be configured to contact at least a portion of the shoulder 110 of the probe. The first seal 152 may comprise a substantially C-shaped cross-sectional profile. In other embodiments, the first seal 152 may comprise a substantially J-shaped cross-sectional profile, a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile. However, it will be appreciated that an arcuate portion of the first seal 152 may be oriented towards the wiper assembly 156. In some embodiments, the arcuate portion of the first seal 152 may be in contact with the wiper assembly 156.

The second seal 154 may generally be disposed between and in contact with the housing 102 and the probe 104. The second seal 154 may be substantially similar to the first seal 152. The second seal 154 may be disposed on an opposing side of the wiper assembly 156 and oriented oppositely with respect to the first seal 152. In some embodiments, the second seal 154 may be configured to contact at least a portion of the shoulder 108 of the housing 102. The second seal 154 may comprise a substantially C-shaped cross-sectional profile. In other embodiments, the second seal 154 may comprise a substantially J-shaped cross-sectional profile, a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile. However, it will be appreciated that an arcuate portion of the second seal 154 may be oriented towards the wiper assembly 156. In some embodiments, the arcuate portion of the second seal 154 may be in contact with the wiper assembly 156.

In some embodiments, the seals 152, 154 may comprise lipseals or any other profile seal. In some embodiments, the seals 152, 154 may generally be formed from a resilient metallic material. More specifically, the seals 152, 154 may be formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze. In some embodiments, the seals 152, 154 may comprise a coating or plating, such as a gold plating, a silver plating, a nickel plating, an aluminum chromium nitride (AlCrN) plating, a titanium aluminum nitride (TiAlN) plating, any other wear-resistant metallic plating, or any combination thereof.

The wiper assembly 156 may generally comprise a first wiper housing component 158, a second wiper housing component 160, and a wiper 162 disposed between the first wiper housing component 158 and the second wiper housing component 160. The first wiper housing component 158 generally comprises a substantially cylindrical outer surface 164 that may be at least partially in contact with the housing 102, a substantially cylindrical inner surface 166 that may be at least partially in contact with the probe 104, and a substantially cylindrical outer radial surface 168. In some embodiments, the first seal 152 may be disposed adjacently to and/or at least partially in contact with the outer surface 168 of the first wiper housing component 158.

The first wiper housing component 158 may also comprise a tapered inner radial surface 170. The tapered inner surface 170 may be configured to bias the wiper 162 towards the probe 104 in response to an axial compressive force on the wiper assembly 156. In some embodiments, the tapered inner surface 170 may form an angle ($\alpha_1$) with the probe 104 and/or an axis of the probe 104. In some embodiments, the tapered inner surface 170 may form an angle ($\alpha_1$) with the probe 104 and/or an axis of the probe 104 of at least 15 degrees, at least 30 degrees, at least 35 degrees, at least 40 degrees, at least 45 degrees, at least 50 degrees, at least 55 degrees, at least 60 degrees, at least 65 degrees, or at least 70 degrees. In some embodiments, the tapered inner surface 170 may form an angle ($\alpha_1$) with the probe 104 and/or an axis of the probe 104 of not greater than 90 degrees, not greater than 85 degrees, not greater than 80 degrees, not greater than 75 degrees, or not greater than 70 degrees. Further, it will be appreciated that the tapered inner surface 170 may form an angle ($\alpha_1$) with the probe 104 and/or an axis of the probe 104 between any of these minimum and maximum values, such as at least 45 degrees to not greater than 85 degrees, or even at least 60 degrees to not greater than 80 degrees.

Additionally, as will be discussed in more detail herein, the first wiper housing component 158 may comprise a recess 172. In some embodiments, the recess 172 may be configured to receive at least a portion, such as elongated portion 182, of the second wiper housing component 160. In some embodiments, the recess 172 and the elongated portion 182 may collectively operate to maintain alignment between the first wiper housing component 158 and the second wiper housing component 160. In some embodiments, the recess 172 and the elongated portion 182 may collectively operate to allow the wiper housing components 158, 160 to translate together, accommodating wear of the wiper without creating a gap for wiper 162 to creep under pressure and/or temperature loads. Further, in some embodiments, the first wiper housing component 158 may comprise a plurality of lobes 173 formed on an outer radial surface of the first wiper housing component 158. As will be discussed later herein, the lobes 173 may operate to translate an axial compressive force applied on the wiper assembly 156 to a tangential force, thereby imparting a differential rotation between the wiper housing components 158, 160, which may tighten the wiper 162 radially about the probe 104. However, in alternative embodiments, the first wiper housing component 158 may be free of lobes 173.

The second wiper housing component 160 generally comprises a substantially cylindrical outer surface 174 that may be at least partially in contact with the housing 102, a substantially cylindrical inner surface 176 that may be at least partially in contact with the probe 104, and a substantially cylindrical outer radial surface 178. In some embodiments, the second seal 154 may be disposed adjacently to and/or at least partially in contact with the outer surface 178 of the second wiper housing component 160.

The second wiper housing component 160 may also comprise a tapered inner radial surface 180 opposite the tapered inner radial surface 170 of the first wiper housing component 158. The tapered inner surface 180 may be configured to bias the wiper 162 towards the probe 104 in response to an axial compressive force on the wiper assembly 156. In some embodiments, the tapered inner surface 180 may form an angle ($\alpha_2$) with the probe 104 and/or an axis of the probe 104. In some embodiments, the tapered inner surface 180 may form an angle ($\alpha_2$) with the probe 104 and/or an axis of the probe 104 of at least 15 degrees, at least 30 degrees, at least 35 degrees, at least 40 degrees, at least 45 degrees, at least 50 degrees, at least 55 degrees, at least 60 degrees, at least 65 degrees, or at least 70 degrees. In some embodiments, the tapered inner surface 180 may form an angle ($\alpha_2$) with the probe 104 and/or an axis of the probe 104 of not greater than 90 degrees, not greater than 85 degrees, not greater than 80 degrees, not greater than 75 degrees, or not greater than 70 degrees. Further, it will be appreciated that the tapered inner surface 180 may form an angle ($\alpha_2$) with the probe 104 and/or an axis of the probe 104 between any of these minimum and maximum values, such as at least 45 degrees to not greater than 85 degrees, or even at least 60 degrees to not greater than 80 degrees.

Additionally, as will be discussed in more detail herein, the second wiper housing component 160 may comprise an elongated portion 182 that at least partially forms an inner surface 181. In some embodiments, the inner surface 181 may be at least partially in contact with the wiper 162. In some embodiments, the elongated portion 182 may be configured to at least partially extend into the recess 172 of the first wiper housing component 158. In some embodiments, the recess 172 and the elongated portion 182 may collectively operate to maintain alignment between the first wiper housing component 158 and the second wiper housing component 160. Further, in some embodiments, the second wiper housing component 160 may comprise a plurality of lobes 183 formed on an outer radial surface of the second wiper housing component 160. As will be discussed later herein, the lobes 183 may operate to translate an axial compressive force applied on the wiper assembly 156 to a tangential force, which may rotate the wiper 162 and tighten the wiper 162 radially about the probe 104. Further, in some embodiments, the lobes 173, 183 may cooperate to translate such axial compressive forces on the wiper assembly 156 to the tangential force, to collectively rotate the wiper 162 and tighten the wiper 162 radially about the probe 104. However, in alternative embodiments, the second wiper housing component 160 may be free of lobes 183.

In some embodiments, the wiper housing components 158, 160 may be formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze. Additionally, in some embodiments, the wiper housing components 158, 160 may comprise a coating or plating, such as a gold plating, a silver plating, a nickel plating, an aluminum chromium nitride (AlCrN) plating, a titanium aluminum nitride (TiAlN) plating, any other wear-resistant metallic plating, or any combination thereof.

The wiper 162 may generally be disposed between the first wiper housing component 158 and the second wiper housing component 160. More specifically, the wiper 162 may be disposed between the tapered inner surface 170 of the first wiper housing component 158 and the tapered inner surface 180 of the second wiper housing component 160. The wiper 162 comprises a first tapered outer surface 190 that is complementary to and in contact with the tapered inner surface 170 of the first wiper housing component 158 and a second tapered outer surface 192 that is opposite from the first tapered outer surface 190 and complementary to and in contact with the tapered inner surface 180 of the second wiper housing component 160. The wiper 162 also comprises a substantially cylindrical outer surface 194 and a substantially cylindrical inner surface 196. Additionally, in some embodiments, the wiper 162 may also comprise a split 163 that extends between the first tapered outer surface 190 and the second tapered outer surface 192 to form a "split ring" wiper 162.

Further, it will be appreciated that the tapered profile of the wiper 162 comprises a wider base at the inner surface 196 as compared to the outer surface 194. As such, it will be appreciated that axial compressive forces applied to the wiper assembly 156 may cause the first wiper housing component 158 and the second wiper housing component 160 to translate relative to each other. When compressed, the tapered inner surfaces 170, 180 of the wiper housing components 158, 160 cooperate with the tapered outer surfaces 190, 192 of the wiper 162 to bias the wiper 162 towards the probe 104, by translating the axial compressive force acting on the wiper assembly 156 to a radial force to sustain contact between the wiper and the probe as the wiper 162 wears. In some embodiments, this may provide more effective wiping of the probe 104 to keep the probe 104 free of contaminants and/or other debris that may affect the integrity of the radial seal formed between the housing 102 and the probe 104. In some embodiments, this may also compensate for wear of the wiper 162.

In some embodiments, the wiper 162 may be formed from PEEK, PTFE, or any other suitable polymer. However, in other embodiments, the wiper 162 may be formed from copper, silver, or bronze. In some embodiments, the wiper 162 may be formed from two or more materials, for example, a PEEK wiper 162 with a band of silver forming the cylindrical inner surface 196.

Figure 2:
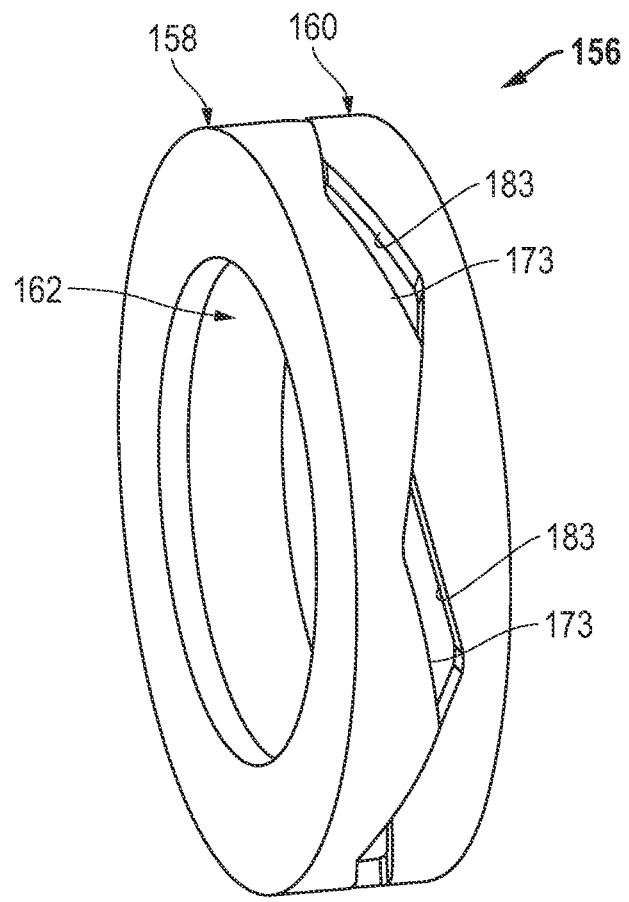
FIG. 2 is an oblique view of a wiper assembly according to an embodiment of the disclosure.
Figure 3:
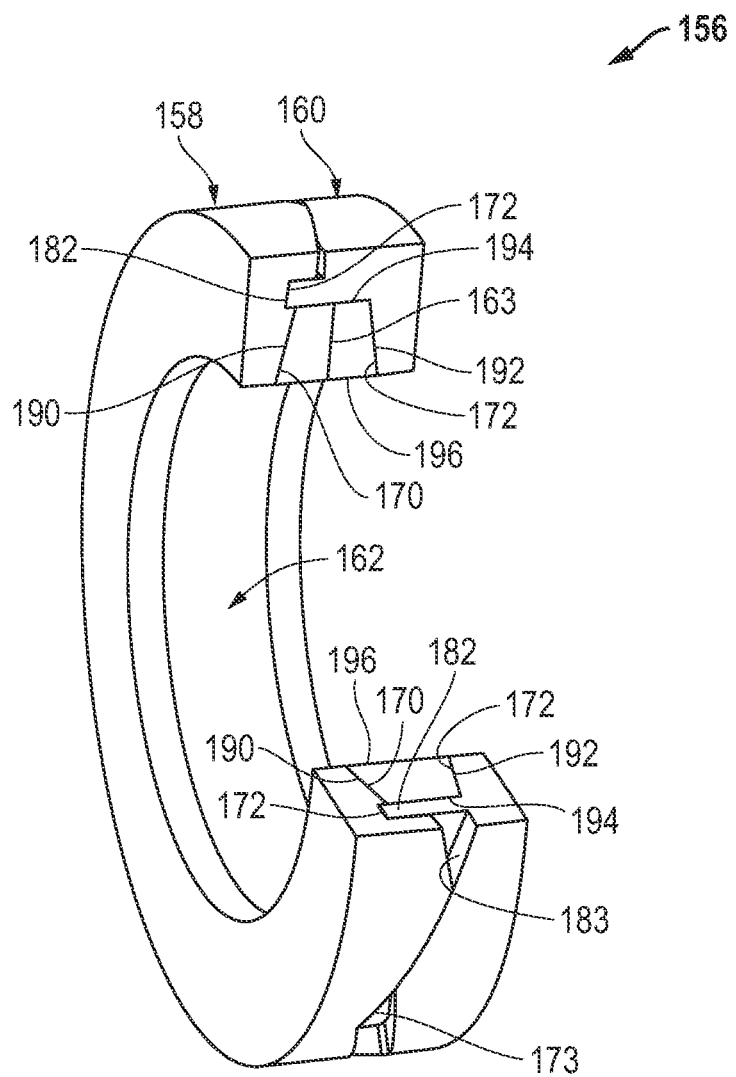
FIG. 3 is a partial cross-sectional view of a wiper assembly according to an embodiment of the disclosure.

FIGS. 2 and 3 show oblique and partial cross-sectional views, respectively, of the wiper assembly 156 according to embodiments of the disclosure. As stated, in some embodiments, the first wiper housing component 158 may comprise a plurality of lobes 173 formed on an outer radial surface of the first wiper housing component 158, and the second wiper housing component 160 may comprise a plurality of lobes 183 formed on an outer radial surface of the second wiper housing component 160. The lobes 173, 183 may comprise alternating tapered surfaces disposed about the circumference of each of the wiper assembly components 158, 160. The lobes 173, 183 may be substantially complementary and cooperate to translate an axial compressive force applied on the wiper assembly components 158, 160 to a tangential force, which causes the wiper assembly components 158, 160 to rotate in opposing directions with respect to one another. In some embodiments, the wiper assembly components 158, 160 may rotate in the same direction provided that one of the wiper assembly components 158, 160 rotates faster and/or further than the other. In some embodiments, the opposing rotating motion of the wiper assembly components 158, 160 may cause the first wiper housing component 158 and the second wiper housing component 160 to translate axially towards each other.

Figure 4:
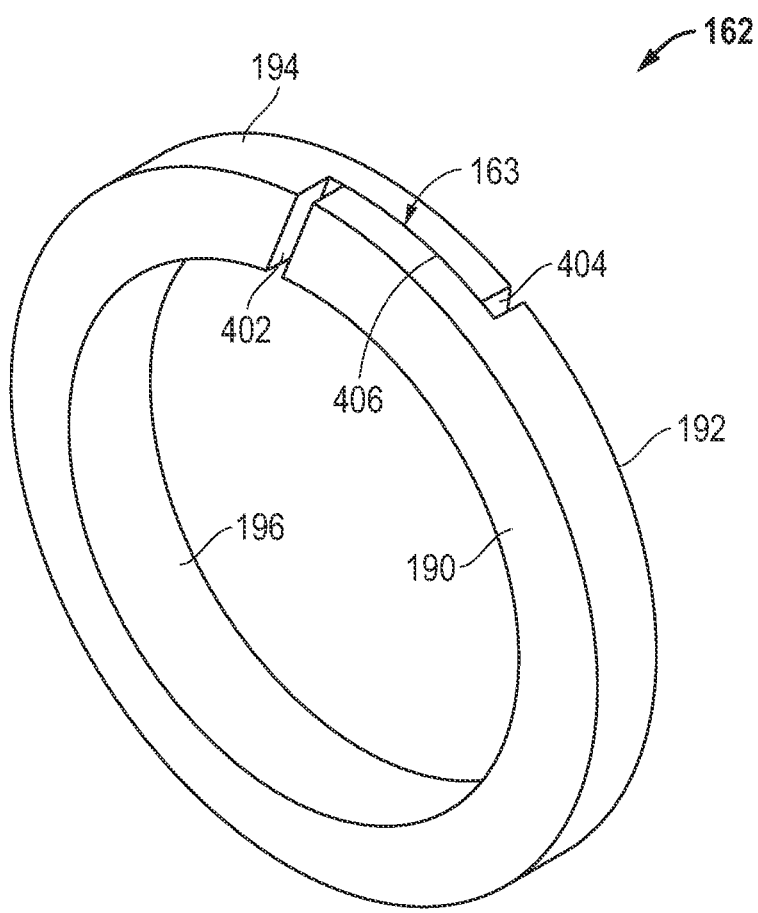
FIG. 4 is an oblique view of a wiper according to an embodiment of the disclosure.

In some embodiments, the axial translation of the first wiper housing component 158 and the second wiper housing component 160 may close the split 163 (e.g., components of the split, such as components 402, 404 shown in FIG. 4) in the wiper, thereby tightening the wiper 162 radially about the probe. In some embodiments, the axial translation of the first wiper housing component 158 and the second wiper housing component 160 may enable the tapered inner surfaces 170, 180 of the wiper housing components 158, 160 to cooperate with the tapered outer surfaces 190, 192 of the wiper 162 to bias the wiper 162 towards the probe 104. Thus, it will be appreciated that the wiper assembly 156 may be configured to translate axial compressive forces to radial forces to increase the contact force that the wiper 162 applies to the probe 104 and/or to sustain contact between the wiper and the probe as the wiper 162 wears. In some embodiments, this may provide more effective wiping of the probe 104 to keep the probe 104 free of contaminants and/or other debris that may affect the integrity of the radial seal formed between the housing 102 and the probe 104.

FIG. 4 is an oblique view of wiper 162 according to an embodiment of the disclosure. In some embodiments, the wiper 162 may comprise a split 163 that extends between the first tapered outer surface 190 and the second tapered outer surface 192 to form a "split ring" wiper 162. The split 163 may comprise a first axial split portion 402 that extends from the first tapered outer surface 190 and at least partially through the wiper 162. The split 163 may also comprise a second axial split portion 404 that extends from the second tapered outer surface 192 and at least partially through the wiper 162. The first axial split portion 402 and the second axial split portion 404 may be offset circumferentially and be connected by a circumferential split portion 406. Collectively, the components 402, 404, 406 of the split 163 allow the wiper 162 to be radially compressed about the probe 104 in accordance with embodiments disclosed herein. In some embodiments, the split 163 may enable more effective wiping of the probe 104 to keep the probe 104 free of contaminants and/or other debris that may affect the integrity of the radial seal formed between the housing 102 and the probe 104.

Figure 5:
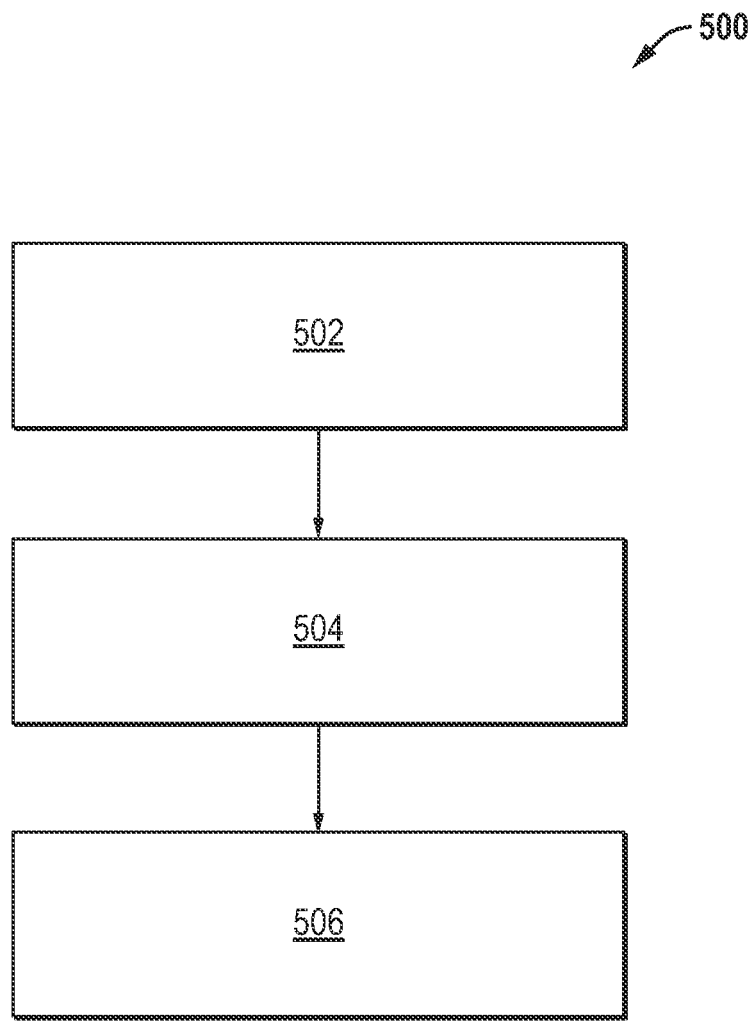
FIG. 5 is a flowchart of a method of forming a radial seal in an assembly according to an embodiment of the disclosure.

FIG. 5 is a method 500 of forming a radial seal in an assembly according to an embodiment of the disclosure. The method 500 may begin at block 502 by providing a seal stack assembly 150 comprising a first metallic seal 152, a second metallic seal 154, and a wiper assembly 156 disposed between the first metallic seal 152 and the second metallic seal 154, wherein the wiper assembly comprises a first wiper housing component 158 having a tapered inner surface 170, a second wiper housing component 160 having a tapered inner surface 180 opposite the tapered inner surface 170 of the first wiper housing component 158, and a wiper 162 disposed between the first wiper housing component 158 and the second wiper housing component 160. In some embodiments, the wiper 162 may comprise a first tapered outer surface 190 that is substantially complementary to the tapered inner surface 170 of the first wiper housing component 158 and a second tapered outer surface 192 that is substantially complementary to the tapered inner surface 180 of the second wiper housing component 160.

The method 500 may continue at block 504 by applying an axial compressive force to the seal stack assembly 150. In some embodiments, applying the axial compressive force to the seal stack assembly 150 may be caused by operating an assembly 100 comprising the seal stack assembly 150. The method 500 may continue at block 506 by converting the axial compressive force to a radial force that increases the contact force between the wiper 162 and the probe 104 and/or to sustain contact between the wiper and the probe as the wiper 162 wears. In some embodiments, translation of the axial compressive force to the radial force may be accomplished by the cooperation between the tapered inner surfaces 170, 180 of the wiper housing components 158, 160 and the tapered outer surfaces 190, 192 of the wiper 162 in accordance with embodiments disclosed herein. In some embodiments, translation of the axial compressive force to the radial force may be accomplished by the closing of the split 402, 404 of the split 163 in accordance with embodiments disclosed herein.

Embodiments of the seal stack assembly 150 may comprise any dimensions suitable for a particular application. In some embodiments, the inner diameter of the seal stack assembly 150 may be at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater. In some embodiments, the outer diameter of the seal stack assembly 150 may be at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Embodiments of an assembly 100, a seal stack assembly 150, and/or a wiper assembly 156 may include one or more of the following:

Embodiment 1. A wiper assembly, comprising: a first wiper housing component having a tapered inner surface; a second wiper housing component having a tapered inner surface opposite the tapered inner surface of the first wiper housing component; and a wiper disposed between the first wiper housing component and the second wiper housing component.

Embodiment 2. A seal stack assembly, comprising: a first metallic seal; a second metallic seal; and a wiper assembly disposed between the first metallic seal and the second metallic seal, the wiper assembly comprising: a first wiper housing component having a tapered inner surface; a second wiper housing component having a tapered inner surface opposite the tapered inner surface of the first wiper housing component; and a wiper disposed between the first wiper housing component and the second wiper housing component.

Embodiment 3. An assembly, comprising: a probe; a housing disposed annularly about the probe; and a seal stack assembly disposed between the probe and the housing and configured to provide a seal between the probe and the housing, the seal stack assembly comprising: a first metallic seal; a second metallic seal; and a wiper assembly disposed between the first metallic seal and the second metallic seal, the wiper assembly comprising: a first wiper housing component having a tapered inner surface; a second wiper housing component having a tapered inner surface opposite the tapered inner surface of the first wiper housing component; and a wiper disposed between the first wiper housing component and the second wiper housing component.

Embodiment 4. The seal stack assembly or the assembly of any of embodiments 2 to 3, wherein the first seal and the second seal comprise a substantially C-shaped cross-sectional profile, a substantially J-shaped cross-sectional profile, a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile.

Embodiment 5. The wiper assembly, the seal stack assembly, or the assembly of embodiment 4, wherein an arcuate portion of the first seal is in contact with the first wiper housing component, and wherein an arcuate portion of the second seal is in contact with the second wiper housing component.

Embodiment 6. The wiper assembly, the seal stack assembly, or the assembly of embodiment 5, wherein the first seal is substantially similar to the second seal.

Embodiment 7. The wiper assembly, the seal stack assembly, or the assembly of embodiment 6, wherein the first seal and the second seal are formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze.

Embodiment 8. The wiper assembly, the seal stack assembly, or the assembly of any of embodiments 1 to 7, wherein the wiper comprises a first tapered outer surface that is complementary to the tapered inner surface of the first wiper housing component and a second tapered outer surface opposite the first tapered outer surface and that is complementary to the tapered inner surface of the second wiper housing component.

Embodiment 9. The wiper assembly, the seal stack assembly, or the assembly of embodiment 8, wherein the tapered inner surfaces form an angle with an axis of the probe of at least 15 degrees, at least 30 degrees, at least 35 degrees, at least 40 degrees, at least 45 degrees, at least 50 degrees, at least 55 degrees, at least 60 degrees, at least 65 degrees, or at least 70 degrees.

Embodiment 10. The wiper assembly, the seal stack assembly, or the assembly of embodiment 9, wherein the tapered inner surfaces form an angle with an axis of the probe of not greater than 90 degrees, not greater than 85 degrees, not greater than 80 degrees, not greater than 75 degrees, or not greater than 70 degrees.

Embodiment 11. The wiper assembly, the seal stack assembly, or the assembly of embodiment 10, wherein the wiper comprises a tapered profile that is wider at an inner surface adjacent to the probe as compared to an outer surface.

Embodiment 12. The wiper assembly, the seal stack assembly, or the assembly of any of embodiments 8 to 11, wherein the wiper comprises a split that extends between the first tapered outer surface and the second tapered outer surface to form a "split ring" wiper.

Embodiment 13. The wiper assembly, the seal stack assembly, or the assembly of embodiment 12, wherein the split ring is configured to allow the wiper to tighten radially about the probe.

Embodiment 14. The wiper assembly, the seal stack assembly, or the assembly of any of embodiments 1 to 13, wherein the wiper is formed from PEEK, PTFE, copper, silver, tin, or bronze, or any combination thereof.

Embodiment 15. The wiper assembly, the seal stack assembly, or the assembly of any of embodiments 1 to 13, wherein the wiper is formed from PEEK and having a copper, silver, tin, gold, or bronze plating on an inner cylindrical surface of the wiper.

Embodiment 16. The wiper assembly, the seal stack assembly, or the assembly of any of embodiments 1 to 15, wherein the tapered inner surfaces of the wiper housing components are configured to bias the wiper towards the probe in response to an axial compressive force on the wiper assembly.

Embodiment 17. The wiper assembly, the seal stack assembly, or the assembly of any of embodiments 1 to 16, wherein the first wiper housing component comprises a recess.

Embodiment 18. The wiper assembly, the seal stack assembly, or the assembly of embodiment 17, wherein the second wiper housing component comprises an elongated portion that is at least partially received by the recess of the first wiper housing component.

Embodiment 19. The wiper assembly, the seal stack assembly, or the assembly of any of embodiments 1 to 18, wherein the first wiper housing component and the second wiper housing component comprise complementary lobes formed on outer radial surfaces of the first wiper housing component and the second wiper housing component.

Embodiment 20. The wiper assembly, the seal stack assembly, or the assembly of embodiment 19, wherein the lobes comprise alternating tapered surfaces disposed about the circumference of each of the wiper assembly components.

Embodiment 21. The wiper assembly, the seal stack assembly, or the assembly of embodiment 20, wherein the lobes operate to translate an axial force applied on the wiper assembly to a radial force to tighten the wiper radially about the probe.

Embodiment 22. The wiper assembly, the seal stack assembly, or the assembly of any of embodiments 1 to 21, wherein the wiper housing components are formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze.

Embodiment 23. The wiper assembly, the seal stack assembly, or the assembly of any of embodiments 1 to 22, wherein the wiper assembly is configured to translate an axial compressive force to a tangential force.

Embodiment 24. The wiper assembly, the seal stack assembly, or the assembly of embodiment 23, wherein the wiper assembly is configured to translate the tangential force to a radial force to increase the contact force between the wiper and the probe.

Embodiment 25. A method of forming a radial seal in an assembly, comprising: providing a seal stack assembly comprising a first metallic seal, a second metallic seal, and a wiper assembly disposed between the first metallic seal and the second metallic seal, wherein the wiper assembly comprises a first wiper housing component having a tapered inner surface, a second wiper housing component having a tapered inner surface opposite the tapered inner surface of the first wiper housing component, and a wiper disposed between the first wiper housing component and the second wiper housing component; applying an axial compressive force to the seal stack assembly; and converting the axial compressive force to a radial force that increases the contact force between the wiper and the probe.

Embodiment 26. The method of embodiment 25, wherein applying the axial compressive force to the seal stack assembly is caused by operating an assembly comprising the seal stack assembly.

Embodiment 27. The method of any of embodiments 25 to 26, wherein the wiper comprises a first tapered outer surface that is complementary to the tapered inner surface of the first wiper housing component and a second tapered outer surface opposite the first tapered outer surface and that is complementary to the tapered inner surface of the second wiper housing component.

Embodiment 28. The method of embodiment 27, wherein translation of the axial compressive force to the radial force is accomplished by the cooperation between the tapered inner surfaces of the wiper housing components and the tapered outer surfaces of the wiper.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A wiper assembly, comprising:
a first wiper housing component having a tapered inner surface;
a second wiper housing component having a tapered inner surface opposite the tapered inner surface of the first wiper housing component; and
a wiper disposed between the first wiper housing component and the second wiper housing component, wherein the first wiper housing component comprises a recess, and wherein the second wiper housing component comprises an elongated portion that is at least partially received by the recess of the first wiper housing component to allow translation of the first wiper housing component with respect to the second wiper housing component.

2. The wiper assembly of claim 1, wherein the wiper comprises a first tapered outer surface that is complementary to the tapered inner surface of the first wiper housing component and a second tapered outer surface opposite the first tapered outer surface and that is complementary to the tapered inner surface of the second wiper housing component.

3. The wiper assembly of claim 2, wherein the tapered inner surfaces form an angle with an axis of a probe of at least 15 degrees.

4. The wiper assembly of claim 3, wherein the tapered inner surfaces form an angle with an axis of the probe of not greater than 90 degrees.

5. The wiper assembly of claim 4, wherein the wiper comprises a tapered profile that is wider at an inner surface adjacent to the probe as compared to an outer surface.

6. The wiper assembly of claim 2, wherein the wiper comprises a split that extends between the first tapered outer surface and the second tapered outer surface to form a "split ring" wiper.

7. The wiper assembly of claim 6, wherein the split ring is configured to allow the wiper to tighten radially about a probe.

8. The wiper assembly of claim 1, wherein the wiper is formed from PEEK, PTFE, copper, silver, tin, or bronze, or any combination thereof.

9. The wiper assembly of claim 1, wherein the wiper is formed from PEEK and having a copper, silver, tin, gold, or bronze plating on an inner cylindrical surface of the wiper.

10. The wiper assembly of claim 1, wherein the tapered inner surfaces of the wiper housing components are configured to bias the wiper towards a probe in response to an axial compressive force on the wiper assembly.

11. The wiper assembly of claim 1, wherein the first wiper housing component and the second wiper housing component comprise complementary lobes formed on outer radial surfaces of the first wiper housing component and the second wiper housing component.

12. The wiper assembly of claim 1, wherein the wiper housing components are formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze.

13. A seal stack assembly, comprising:
a first metallic seal;
a second metallic seal; and
a wiper assembly disposed between the first metallic seal and the second metallic seal, the wiper assembly comprising:
a first wiper housing component having a tapered inner surface;
a second wiper housing component having a tapered inner surface opposite the tapered inner surface of the first wiper housing component; and
a wiper disposed between the first wiper housing component and the second wiper housing component, wherein the first wiper housing component comprises a recess, and wherein the second wiper housing component comprises an elongated portion that is at least partially received by the recess of the first wiper housing component to allow translation of the first wiper housing component with respect to the second wiper housing component.

14. The seal stack assembly of claim 13, wherein the first seal and the second seal comprise a substantially C-shaped cross-sectional profile, a substantially J-shaped cross-sectional profile, a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile.

15. The seal stack assembly of claim 14, wherein an arcuate portion of the first seal is in contact with the first wiper housing component, and wherein an arcuate portion of the second seal is in contact with the second wiper housing component.

16. The seal stack assembly of claim 15, wherein the first seal is substantially similar to the second seal.

17. The seal stack assembly of claim 16, wherein the first seal and the second seal are formed from a nickel-chromium based alloy such as Inconel®, a nickel-based alloy, a cobalt-chromium-nickel-molybdenum alloy, a cobalt-chromium-nickel alloy such as Elgiloy®, nickel, titanium, tungsten, stainless steel, spring steel, steel, aluminum, zinc, copper, magnesium, tin, platinum, lead, iron, or bronze.

18. An assembly, comprising:
a probe;
a housing disposed annularly about the probe; and
a seal stack assembly disposed between the probe and the housing and configured to provide a seal between the probe and the housing, the seal stack assembly comprising:
a first metallic seal;
a second metallic seal; and
a wiper assembly disposed between the first metallic seal and the second metallic seal, the wiper assembly comprising:
a first wiper housing component having a tapered inner surface;
a second wiper housing component having a tapered inner surface opposite the tapered inner surface of the first wiper housing component; and
a wiper disposed between the first wiper housing component and the second wiper housing component, wherein the first wiper housing component comprises a recess, and wherein the second wiper housing component comprises an elongated portion that is at least partially received by the recess of the first wiper housing component to allow translation of the first wiper housing component with respect to the second wiper housing component.

* * * * *